United States Patent
Watase

(10) Patent No.: US 6,472,063 B1
(45) Date of Patent: Oct. 29, 2002

(54) MAGNETIC RECORDING MEDIUM

(75) Inventor: Shigeharu Watase, Saku (JP)

(73) Assignee: TDK Corporation, Tokyo (JP)

( * ) Notice: Subject to any disclaimer, the term of this patent is extended or adjusted under 35 U.S.C. 154(b) by 80 days.

(21) Appl. No.: 09/660,504

(22) Filed: Sep. 12, 2000

(30) Foreign Application Priority Data

Sep. 13, 1999 (JP) .......................................... 11-259536

(51) Int. Cl.$^7$ .............................................. G11B 5/702
(52) U.S. Cl. ............. 428/336; 428/694 B; 428/694 BS; 428/900
(58) Field of Search .............................. 428/336, 694 B, 428/694 BS, 900, 694 BC, 425.9

(56) References Cited

U.S. PATENT DOCUMENTS 4,985,295 A * 1/1991 Ishihara et al. ............. 428/213
5,712,028 A * 1/1998 Seki et al. .................. 428/216

FOREIGN PATENT DOCUMENTS

| JP | 07282438 A | 10/1995 |
| JP | 10083530 A | 3/1998 |
| JP | 10302243 A | 11/1998 |
| JP | 10312525 A | 11/1998 |

* cited by examiner

*Primary Examiner*—Stevan A. Resan
(74) *Attorney, Agent, or Firm*—Rader, Fishman & Grauer PLLC

(57) ABSTRACT

A magnetic recording medium comprising at least a lower non-magnetic layer containing at least a non-magnetic powders and a binder resin formed on a non-magnetic support and an upper magnetic layer formed on the lower non-magnetic layer, wherein the magnetic recording medium is used for a recording-reproducing system in which recorded signals are reproduced by an MR head, and a plastic deformation hardness Hv from the upper magnetic layer surface to an indentation depth of 0.1 μm is 100 to 200 mgf/μm$^2$ and a Young's modulus E in a thickness direction from the upper magnetic layer surface to the indentation depth of 0.1 μm is 2000 to 3000 mgf/μm$^2$.

7 Claims, 1 Drawing Sheet

MAGNETIC RECORDING MEDIUM

BACKGROUND OF THE INVENTION

1. Field of the Invention

The present invention relates to a magnetic recording medium having a coat-type magnetic layer, and more specifically to a magnetic recording medium with errors improved in the MR head recording-reproducing system.

2. Disclosure of the Related Art

In recent years, the magnetic recording medium such as VTR tape, audio tape, computer tape, etc. is required for high-density recording for increased performance, recording longer time, and reduced size and weight, and a system that uses the MR head is presently under investigation.

Because when the MR head is used, high-hardness AlTiC is frequently used for the MR head sliding portion, with the coating layer design such as the conventional magnetic recording medium, problems occur in durability.

For cases with a combination with the MR head reproducing system taken into account, for example, in Japanese Laid-open Patent Publication No. Hei 10-312525 (1998), there is disclosed that the saturated magnetic flux density of the magnetic layer with the hexagonal ferrite powder is 300G to 1000G and the coercive force is 2000 Oe or more, or the saturated magnetic flux density of the magnetic layer with ferromagnetic metal powder is 800G to 1500G and the coercive force is 2000 Oe or more. In Japanese Laid-open Patent Publication No. Hei 10-302243 (1998), there is disclosed that the projection height on the magnetic layer surface and the reversal-volume of magnetization are prescribed and the coercive force of the magnetic layer is 2000 Oe or more.

However, there has not yet been obtained a magnetic recording medium that provides satisfactory durability suited for the MR head.

SUMMARY OF THE INVENTION

Accordingly, it is an object of the present invention to provide a high-density magnetic recording medium that can record and reproduce without any problem even if a head with an extremely hard sliding surface is used and that provides remarkable durability.

The inventor of the present invention worked assiduously and has found that even in an MR (magneto-resistive) head recording-reproducing system, a magnetic recording medium with excellent durability is able to be obtained by specifying the plastic deformation hardness of the sub-surface-layer of the magnetic layer and Young's modulus in the thickness direction of the magnetic layer to a specific range, and has completed the present invention.

That is, the present invention relates to a magnetic recording medium comprising at least a lower non-magnetic layer containing at least a non-magnetic powder and a binder resin formed on a non-magnetic support and an upper magnetic layer formed on the lower non-magnetic layer, wherein the magnetic recording medium is used for a recording-reproducing system in which recorded signals are reproduced by an MR head, and a plastic deformation hardness Hv from the upper magnetic layer surface to an indentation depth of 0.1 $\mu$m is 100 to 200 mgf/$\mu$m$^2$ and a Young's modulus E in a thickness direction from the upper magnetic layer surface to the indentation depth of 0.1 $\mu$m is 2000 to 3000 mgf/$\mu$m$^2$.

The binder resin contained in the lower non-magnetic layer is preferably radiation curing type binder resin.

The upper magnetic layer preferably contains a resin with polar functional group as a binder resin. A thickness of the upper magnetic layer is preferably 0.3 $\mu$m or less.

According to the present invention, because the plastic deformation hardness Hv of the sub-surface-layer of the magnetic layer is specified to 100 to 200 mgf/$\mu$m$^2$ and the Young's modulus E in the thickness direction to 2000 to 3000 mgf/$\mu$m$^2$, durability is able to be improved in a system using the MR head. Now, the plastic deformation hardness Hv of the sub-surface-layer and the Young's modulus E in the thickness direction mean respectively the plastic deformation hardness Hv and the Young's modulus E in the thickness direction from the surface of the upper magnetic layer of the medium to the indentation depth of 0.1 $\mu$m.

When the plastic deformation hardness Hv (plastic hardness) and/or the Young's modulus E in the thickness direction (elastic hardness) deviate from the scope of the present invention, nonconformity as shown below occurs. When the plastic deformation hardness is smaller than 100 mgf/$\mu$m$^2$ and/or when the Young's modulus in the thickness direction is smaller than 2000 mgf/$\mu$m$^2$, the coating layer is scraped at the head sliding section and durability is degraded. When the plastic deformation hardness is greater than 200 mgf/$\mu$m$^2$, the easiness of slitting is degraded and error is aggravated because of omission of coating layer from the tape edge portion. When the Young's modulus in the thickness direction is greater than 3000 mgf/$\mu$m$^2$, spacing loss is generated with the head because of excessively hard coating layer, and the lowered output results. In the present invention, the preferable plastic deformation hardness Hv is in a range of 120 to 170 mgf/$\mu$m$^2$, and the preferable Young's modulus E in the thickness direction is in a range of 2300 to 2750 mgf/$\mu$m$^2$. It is more suitable if both Hv and E are respectively in the preferable ranges.

There are several methods for controlling respectively the plastic deformation hardness and the Young's modulus in the thickness direction to the above specific ranges. The present invention is not particularly limited to the following, but for example, methods such as adjusting the elastic modulus by combining a plurality of binders in the magnetic layer, adjusting the dispersibility of the coating layer by the binder resin with polar functional group introduced, or adjusting calendaring conditions or thermosetting conditions are effective. In particular, the plastic deformation hardness Hv tends to increase by increasing the calendaring conditions (still higher temperature, higher linear pressure). The Young's module E in the thickness direction tends to increase by increasing the thermosetting temperature. Consequently, even when the same magnetic coating material is used, it is recommended to investigate various conditions for preparing the magnetic recording medium as required.

According to the present invention, a high-density magnetic recording medium with remarkable durability that can records and reproduces easily even when the MR head with an extremely hard sliding surface is used.

DETAILED DESCRIPTION OF THE INVENTION

Figure 1:
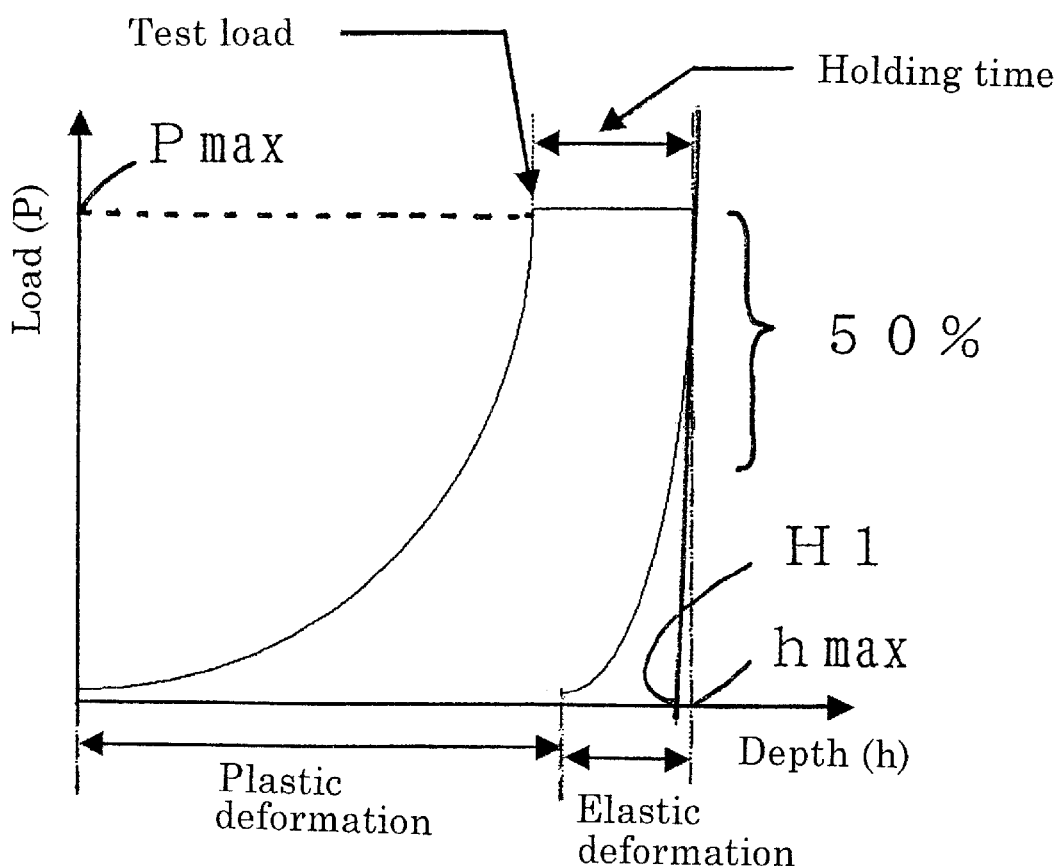
FIG. 1 is a graph [the depth (h) vs. load (P)] when unloading is carried out to find out the plastic deformation hardness (Hv) and the Young's modulus (E).

Now, the specific configurations of the present invention will be described in detail thereafter.

The magnetic recording medium of the present invention has at least two coating layers on a non-magnetic support, that is, a lower non-magnetic layer and an upper magnetic layer preferably having a thickness of 0.3 μm or less formed in this order, and on the surface opposite to that with the magnetic layer of the non-magnetic support provided, a back-coat layer is formed as required. In the present invention, a lubricant coating layer, and/or various coating layers for protecting the magnetic layer may be formed on the upper magnetic layer as required. Also, on the surface of the non-magnetic support, on which the magnetic layer is to be formed, an undercoat layer (adhesion facilitating layer) may be formed for improving adhesion between the coating layer and the non-magnetic support.

[Lower Non-magnetic Layer]

The lower non-magnetic layer contains at least a carbon black and a binder resin.

By allowing the lower non-magnetic layer to contain carbon black, a lubricant is able to be held in the layer. As a result, the content of the lubricant on the upper magnetic layer surface is able to be easily adjusted to a desired range. When the thickness of the upper magnetic layer is as thin as less than 0.3 μm, it is difficult for the upper magnetic layer only to contain a sufficient amount of lubricant, and the carbon black of the lower layer is an important component. The carbon black of the lower non-magnetic layer has an effect to lower the surface electric resistance of the upper magnetic layer as well as an effect to reduce the light transmittance.

Examples of carbon black contained in the non-magnetic layer include furnace black for rubber, thermal black for rubber, black for color, acetylene black, etc. Preferably the carbon black has a specific surface area of 5 to 600 m$^2$/g, a DBP oil absorption of 30 to 400 mL/100 g, and an average particle size of 10 to 100 nm. The carbon black which can be used may be referred specifically to "Carbon Black Almanac," compiled by the Society of Carbon Black.

For the non-magnetic layer, various inorganic powders may be used in addition to carbon black, and for example, needle-like non-magnetic iron oxide (α-$Fe_2O_3$), etc. may be used. However, the use of spherical super-fine particle iron oxide can achieve high dispersibility, and the filling ratio of particles in the non-magnetic layer can be increased. Consequently, the surface smoothness of the non-magnetic layer itself is improved, and as a result, the surface smoothness of the magnetic layer is improved, and the electromagnetic conversion characteristics are improved. In addition to these, various non-magnetic powders such as $CaCO_3$, titanium oxide, barium sulfate, α-$Al_2O_3$ may be used.

The composition ratio of carbon black to inorganic powders is preferably 100/0 to 75/25 by weight ratio. When the composition ratio of inorganic powders exceeds 25% by weight, problems occur in surface electric resistance.

The composition ratio of carbon black in the lower non-magnetic layer is 35 to 90% by weight and preferably 40 to 85% by weight. When the composition ratio of carbon black is less than 35% by weight, the desired amount of lubricant is unable to be held. On the other hand, when carbon black is used in the ratio of 90% by weight, the sufficient amount of lubricant is able to be held, and when carbon black is used more than 90% by weight, the ratio of the binder resin in the lower non-magnetic layer lowers and sufficient strength of the coating layer is unable to be obtained.

The binder resin used for the non-magnetic layer may be any of the binders, such as thermoplastic resin, reactive type resin, radiation curing type resin, etc. For the thermoplastic resin, that having a softening temperature of 150° C. or lower, and an average molecular weight of about 5000 to 200000 is preferable, and examples include vinyl chloride type copolymer, polyurethane resin, (meth) acryl resin, polyester resin, nitrocellulose, phenoxy type resin, and others. Of all, the resin which has hydroxyl group at terminal and/or side chain of the copolymer is suited because radiation crosslinking, etc. are able to be easily utilized after crosslinking using isocyanate as reactive type resin or radiation functional type modification is carried out.

However, with thermoplastic resin and reactive type resin which have been used conventionally, the raw roll coated with non-magnetic layer must be placed in an oven for a long time (for example, at 70° C. for 2 to 48 hours) and cured in order to obtain sufficient coating layer properties. This causes problems of deformation of the non-magnetic coating layer due to tightened winding or lowering surface smoothness of the non-magnetic coating layer, not to mention the time and labor required in the manufacturing process. In addition, in the manufacturing method for coating the upper magnetic layer while the lower non-magnetic layer is still wet, the interface between the upper magnetic layer and the lower non-magnetic layer becomes nonuniform depending on the characteristics of the coating materials, possibly resulting in output variations.

Consequently, the radiation curing type binder resin is the most preferable as the binder of the lower non-magnetic layer. In order to eliminate the defects as mentioned above, in the present invention, the radiation curing type binder resin is used for the binder resin of the lower non-magnetic layer, the lower non-magnetic layer coating material is applied on a non-magnetic support, dried, and smoothened; then, radiation is irradiated, the three-dimensional crosslinking is allowed to occur; and then, the upper magnetic layer coating material is applied on the lower layer, and thereby a good result is able to be obtained. According to this process, since the lower non-magnetic layer has the three-dimensional crosslinking when the upper magnetic layer is formed, it is not subject to swelling caused by an organic solvent of the magnetic coating material. Consequently, because the magnetic coating material is able to be applied directly to the lower non-magnetic layer immediately after the lower non-magnetic layer is formed, continuation and simplification of the process is able to be achieved.

The radiation curing type binder resin used in the present invention is the resin containing one or more unsaturated double bonds in the molecular chains which generates radicals by radiation and cures by crosslinking or polymerizing.

Examples of radiation curing type binder resin include vinyl chloride type resin, polyurethane resin, polyester resin, epoxy type resin, phenoxy resin, fiber type resin, polyether type resin, polyvinyl alcohol type resin, and many other resins. Of these, vinyl chloride type resin and polyurethane resin are typical, and it is preferable to use the both in combination.

The content of the radiation curing binder in the lower non-magnetic layer is preferably 10 to 100 parts by weight, and more preferably 12.5 to 70 parts by weight with respect to 100 parts by weight of the total of carbon black and organic powders. When the content of the binder is excessively small, the ratio of binder resin in the lower non-magnetic layer lowers and sufficient strength of the coating layer is unable to be obtained. When the content of the binder is excessively large, dispersion failure occurs at the time of preparing the lower non-magnetic layer coating material and a smooth surface of the lower non-magnetic layer is unable to be formed.

Examples of radiation used in the present invention include the electron beam, γ ray, β ray, ultraviolet ray, etc., and the preferable one is the electron beam. The irradiation dose is preferably 1 to 10 Mrad and more preferably 3 to 7 Mrad. The irradiation energy (acceleration voltage) is preferably 100 kV or more. The radiation is preferably irradiated before winding after coating and drying, but it may be irradiated after winding.

In the lower non-magnetic layer of the present invention, the lubricant is preferably contained as required. For the lubricant, irrespective of saturated or unsaturated, one or two kinds or more of known fatty acids, esters, and saccharides may be used individually or mixed. Preferably, two kinds or more of fatty acids and/or esters having respectively different melting points are used in combination. This is because the lubricant that matches any temperature environment used for the magnetic recording medium must be continuously fed to the medium surface.

Specifically, for the fatty acid, saturated straight-chain fatty acids such as stearic acid, palmitic acid, myristic acid, lauric acid, erucic acid etc.; fatty acids which are saturated and have side chains, such as isocetylic acid, isostearic acid, etc.; and unsaturated fatty acids such as oleic acid, linoleic acid, linolenic acid, etc. can be used suitably. Foresters, there are straight-chain saturated fatty acid esters such as butyl stearate, butyl palmitate, etc.; saturated fatty acid esters with side chains such as isocetyl stearate, isostearyl stearate etc.; unsaturated fatty acid esters such as isostearyl oleate, etc.; fatty acid esters of unsaturated alcohol such as oleyl stearate, etc.; esters of unsaturated fatty acid and unsaturated alcohol such as oleyl oleate, etc.; esters of dihydric alcohol such as ethylene glycol distearate, etc.; esters of dihydric alcohol and unsaturated fatty acid esters such as ethylene glycol monooleate, ethylene glycol dioleate, neopentyl glycol dioleate, etc.; and esters of saturated or unsaturated fatty acid and saccharides such as sorbitan monostearate, sorbitan tristearate, sorbitan monooleate, sorbitan trioleate, etc. The content of the lubricant of the lower non-magnetic layer may be adjusted suitably in accord with objects, but is preferably 1 to 20% by weight with respect to the total weight parts of carbon black and inorganic powders.

The coating material for forming the lower non-magnetic layer is prepared by adding an organic solvent to the above-mentioned components. There is no particular limit to the organic solvent used, and one or two kinds or more various solvents such as ketone type solvents such as methyl ethyl ketone (MEK), methyl isobutyl ketone, cyclohexanone, etc., or aromatic type solvents such as toluene, etc. may be suitably chosen and used. The amount of organic solvent added may be about 100 to 900 parts by weight with respect to 100 parts by weight of a total amount of solids (carbon black and various inorganic powders, etc.) and the binder.

The surface roughness of the lower non-magnetic layer (here, the surface roughness was expressed by the centerline average height (JIS-B-0601) Ra) must be satisfactory. Ra after smoothing treatment of the lower non-magnetic layer is preferably 8.0 nm or lower, and more preferably 6.0 nm or lower, and the most preferably 5.0 nm or lower. When Ra exceeds 8.0 nm, the interface between the upper magnetic layer and the lower non-magnetic layer tends to become nonuniform, and output variation tends to occur.

The thickness of the lower non-magnetic layer is in general 0.1 to 2.5 μm, and preferably 0.3 to 2.3 μm. When the non-magnetic layer is excessively thin, it tends to be subject to the influence of surface roughness of the non-magnetic support, and as a result, the surface smoothness of the non-magnetic layer is degraded and the surface smoothness of the magnetic layer is degraded, and the electromagnetic conversion characteristics tend to lower. In addition, because the light transmittance becomes higher, problems occur when the tape end is detected by the change of light transmittance. On the other hand, increasing the thickness of the non-magnetic layer exceeding a certain level does not improve the performance.

[Upper Magnetic Layer]

The upper magnetic layer contains at least a ferromagnetic powder, a binder resin, and an abrasive.

In the present invention, for the ferromagnetic powder, metal alloy fine powder or hexagonal plate-like fine powder are desirable to be used. Preferably the metal alloy fine powder has a coercive force Hc of 1500 to 3000 Oe, a saturation magnetization σ s of 120 to 160 emu/g, an average major axis length of 0.05 to 0.2 μm, an average minor axis length of 10 to 20 nm, and an aspect ratio of 1.2 to 20. Hc of the medium fabricated is preferably 1500 to 3000 Oe. For additive elements, Ni, Zn, Co, Al, Si, Y and other rare earth elements etc. may be added in accord with purposes. Preferably the hexagonal plate-like fine powder has a coercive force Hc of 1000 to 2000 Oe, a saturation magnetization σ s of 50 to 70 emu/g, an average flake particle diameter of 30 to 80 nm, and a plate ratio of 3 to 7. Hc of the medium fabricated is preferably 1200 to 2200 Oe. For additive elements, Ni, Co, Ti, Zn, Sn and other rare earth elements etc. may be added in accord with purposes. For other materials, known materials may be used in accord with purposes without particular limitation.

The above ferromagnetic powder may be contained by about 70 to 90% by weight in the magnetic layer composition. When the content of the ferromagnetic powder is excessively large, the content of the binder reduces and the surface smoothness by calendering tends to be degraded, whereas when the content of the ferromagnetic powder is excessively small, no high reproduction output is able to be obtained.

For the binder resin, thermoplastic resin, thermosetting or reactive type resin, radiation curing type binder resin may be used.

Examples include polyester-polyurethane resin, vinyl chloride type copolymer, vinyl chloride-acrylate type copolymer, vinyl chloride-vinyl acetate type copolymer, vinyl chloride-vinylidene chloride type copolymer, vinyl chloride-acrylonitrile type copolymer, acrylate-acrylonitrile type copolymer, acrylate-vinylidene chloride type copolymer, methacrylate-vinylidene chloride type copolymer, methacrylate-ethylene type copolymer, poly (vinyl fluoride)-vinylidene chloride-acrylonitrile type copolymer, acrylonitrile-butadiene type copolymer, polyamide resin, poly(vinyl butyral), cellulose derivatives (cellulose acetate butyrate, cellulose diacetate, cellulose triacetate, cellulose propionate, nitrocellulose, etc.), styrene-butadiene type copolymer, polyester resin-chlorovinylether acrylate type copolymer, amino resin, and synthetic rubber thermoplastic resins etc.

The above resin preferably contains acidic polar group, basic polar group, betaine, etc. including —COOH, —SO$_3$M, —OSO$_3$M, —OPO$_3$X, —PO$_3$X, —PO$_2$X, —N$^+$R$_3$Cl$^{31}$, —NR$_2$, etc. (X represents H or alkaline metal, and R represents H or alkyl group) as the polar group at terminal and/or side chain of the resin. The resin containing these polar groups is suitable for adjustment or improvement of dispersibility, and the plastic deformation hardness Hv and the Young's modulus E in the thickness direction become able to be controlled by using such resin. These may be used individually in one kind or in combination of two or more kinds.

Among these, the binder resin preferably used is a combination of vinyl chloride type copolymer with polyurethane resin, and the mean Tg when combined is preferably 40° C. or more and 80° C. or less, and more preferably 50 to 70° C. The mean Tg is able to be found by adding Tg of each resin by weight average.

The content of the binder used for the magnetic layer is 5 to 40 parts by weight, and particularly preferably 10 to 30 parts by weight with respect to 100 parts by weight of ferromagnetic powders. When the content of the binder is excessively small, the strength of the magnetic layer lowers, and the running durability tends to be degraded. On the other hand, when the content of the binder is excessively large, the content of ferromagnetic powders lowers and the electromagnetic conversion characteristics tend to be degraded.

For a crosslinking agent for curing these binders, various polyisocyanates, particularly, diisocyanate can be used, and particularly, one or more kinds of tolylene diisocyanate, hexamethylene diisocyanate, methylene diisocyanate are preferably used. The crosslinking agent is particularly preferably used as crosslinking agent modified by compound having two or more hydroxyl groups such as trimethylolpropane, etc. or isocyanurate type crosslinking agent consisting of three molecules of diisocyanate compound, and is bonded to functional groups, etc. contained in the binder resin and crosslink the resin. The content of the crosslinking agent is preferably 10 to 30 parts by weight with respect to 100 parts by weight of the binder.

Because the Young's modulus E in the thickness direction tends to increase by increasing the resin curing temperature or curing time, it is desirable to adjust the curing conditions suitably in accord with the mean Tg of the resins used. For example, if the mean Tg of the resins used is 40 to 70° C., the curing time is preferably 12 to 48 hours at 50 to 70° C. When the mean Tg exceeds 70° C., the curing time is preferably 12 to 48 hours at 50 to 60° C.

In addition, in the magnetic layer, abrasive is contained in order to improve mechanical strength of the magnetic layer and to prevent clogging of the magnetic head. For the abrasive, it is preferable to contain at least one kind of abrasives with a Mohs hardness of 6 or higher, preferably the Mohs hardness of 9 or higher, such as α-alumina (Mohs hardness: 9), chromium oxide (Mohs hardness: 9), silicon carbide (Mohs hardness: 9.5), silicon oxide (Mohs hardness: 7), aluminum nitride (Mohs hardness: 9), boron nitride (Mohs hardness: 9.5), etc. These are, in general, amorphous, prevents clogging of the magnetic head, and improves the strength of the coating layer.

The average particle size of the abrasive is, for example, 0.01 to 0.2 μm, and preferably 0.05 to 0.2 μm. When the average particle size is excessively large, the projections from the magnetic layer surface increase, and thereby, degradation of electromagnetic conversion characteristics, increase of drop-out and increase of head wear etc. tend to occur. When the average particle size is excessively small, the projections from the magnetic layer surface decrease and effects of preventing head clogging become insufficient.

The average particle size is, in general, measured by a transmission electron microscope. The content of the abrasive is preferably 3 to 25 parts by weight, and more preferably 5 to 20 parts by weight with respect to 100 parts by weight of the ferromagnetic powders.

In addition, in the magnetic layer, a dispersing agent such as surfactant, etc., a lubricant such as higher fatty acid, fatty acid ester, silicon oil, etc., and other various additives may be added.

The coating material for forming the magnetic layer may be prepared by adding organic solvents to each component mentioned above. There is no particular limitation to the organic solvent used and organic solvents similar to those used for the lower non-magnetic layer may be used.

The thickness of the upper magnetic layer is 0.30 μm or less, and preferably 0.05 to 0.30 μm, and more preferably 0.10 to 0.25 μm. When the magnetic layer is excessively thick, self-magnetization loss and thickness loss increase.

The centerline average height (Ra) of the upper magnetic layer surface is 1.0 to 8.0 nm, and preferably 2.0 to 7.0 nm. When Ra is less than 1.0 nm, the surface is excessively smooth, and thereby the running stability is degraded, and troubles during running tend to occur frequently. On the other hand, when Ra exceeds 8.0 nm, the magnetic layer surface becomes rough, and thereby in the reproduction system using the MR type head, electromagnetic conversion characteristics such as reproduced output, etc. become degraded.

[Back-coat Layer]

The back-coat layer is provided for improving the running stability and preventing electrification of the magnetic layer, etc. The back-coat layer preferably contains 30 to 80% by weight of carbon black. When the carbon black content is excessively small, the electrification preventing effect tends to lower, and in addition, the running stability tends to lower. Also the light transmittance of the medium tends to increase, and thereby problems occur in the system for detecting the tape end by the change of light transmittance. On the other hand, when the carbon black content is excessively large, the strength of the back-coat layer lowers, and the running durability tends to degrade. Any kind of carbon black may be used if it is used in general, and the average particle size is preferably about 5 to 500 nm. The average particle size is, in general, measured by a transmission type electron micrograph.

In the back-coat layer, besides the carbon black, non-magnetic inorganic powders such as various abrasives, etc. mentioned above in describing the magnetic layer may be contained in order to improve the mechanical strength. The content of non-magnetic inorganic powder is preferably 0.1 to 5 parts by weight, and more preferably 0.5 to 2 parts by weight with respect to 100 parts by weight of carbon black. The average particle size of non-magnetic inorganic powder is preferably 0.1 to 0.5 μm. When the content of this kind of non-magnetic inorganic powder is excessively small, the mechanical strength of the back-coat layer tends to become insufficient, while if the content is excessively great, the wear rate of guides, etc. in the tape sliding passage tends to increase.

In addition to these, a dispersing agent such as surfactant, etc., a lubricant such as higher fatty acid, fatty acid ester, silicon oil, etc., and other various additives may be added.

The binder, crosslinking agent, solvent, etc. used for the back-coat layer may be the same as those used for the coating material for the magnetic layer mentioned above. The content of the binder is preferably 15 to 200 parts by weight, and more preferably 50 to 180 parts by weight with respect to 100 parts by weight of the total solids. When the binder content is excessively large, friction with the medium sliding passage becomes excessively large, the running stability lowers, and hence running accidents tend to occur frequently. In addition, problems such as blocking with the magnetic layer, etc. tend to occur. When the binder content is excessively small, the strength of the back-coat layer lowers and the running durability tends to lower.

The thickness of the back-coat layer (after calendering) is 1.0 μm or less, and preferably 0.1 to 1.0 μm, and more preferably 0.2 to 0.8 μm. When the back-coat layer is excessively thick, friction with the medium sliding passage becomes too large, and hence the running stability tends to lower. On the other hand, when the back-coat layer is excessively thin, the surface smoothness of the back-coat layer lowers due to influence of the surface roughness of the non-magnetic support. Consequently, when the back-coat is thermo-cured, the surface roughness of the back-coat layer is transferred to the magnetic layer surface, resulting in lowering of the output in high-frequencies, S/N and C/N. When the back-coat layer is excessively thin, abrasion of the back-coat layer occurs during the running of the medium.

[Non-magnetic Support]

There is no particular limitation to materials used for the non-magnetic support. The material of the non-magnetic support may be selected from various flexible materials and various rigid materials corresponding to the object and made into a given shape and size such as a tape form corresponding to various standards. Examples of the flexible material include various type resins, for example, polyesters such as polyethylene terephthalate and polyethylene naphthalate, polyolefins such as polypropylene, polyamides, polyimides and polycarbonates.

The thickness of the non-magnetic support is preferably 3.0 to 75.0 $\mu$m. The shape of the non-magnetic support may be, though not particularly limited to, a tape form, sheet form, card form or disk form and the like. Various materials may be selected and used according to the shape and requirements.

The surface roughness of the non-magnetic support used in the present invention is 20 nm or lower, and preferably 15 nm or lower in terms of the centerline average surface height Ra. The surface roughness of the non-magnetic support is freely controlled by the size and the amount of filler added to the non-magnetic support as required. Examples of the filler include organic resin fine powder such as acrylic type resin in addition to oxides or carbonates of Ca, Si, T, Al and the like, and a combination of $Al_2O_3$ and organic resin fine powder is preferable.

[Manufacturing Process]

The magnetic recording medium of the present invention may be manufactured by preparing the lower non-magnetic layer coating material and the upper magnetic layer coating material, respectively, using the above-mentioned materials, and applying the coating materials on the non-magnetic support in that order.

Each coating material for the lower non-magnetic layer and the upper magnetic layer is manufactured by at least a kneading step and a dispersing step, as well as by a mixing step, viscosity adjusting step and filtering step before and/or after these steps, as required. Each steps may be divided into two or more stages. Any of the materials such as ferromagnetic powders, non-magnetic inorganic powders, binders, abrasives, carbon blacks, lubricants, solvents, etc. may be added at the beginning or in the midway of any step. In addition, individual material may be divided and added in two or more steps.

For kneading and dispersing of the coating material, the conventionally known techniques may, of course, be used in part or whole of the processes, but in the kneading step, any machine having strong kneading force such as a continuous kneader or a pressure kneader is preferably used. When the continuous kneader or pressure kneader is used, the ferromagnetic powder or the non-magnetic inorganic powder and all or part of the binder (however, preferably 10% or more by weight of all the binder) are kneaded. The slurry temperature at the time of kneading is preferably 50° C. to 110° C.

For dispersing the coating material, it is desirable to use a dispersing media of high specific gravity, and ceramic type media such as zirconia, titania, etc. are suitable. Glass beads, metal beads, alumina beads, etc. which have been conventionally used may be selected and used depending on the composition.

In manufacturing the magnetic recording medium, it is preferable that the lower non-magnetic layer coating material is applied onto the non-magnetic support and dried, and resulting layer is smoothed and radiation-irradiated to obtain the lower non-magnetic layer, and then the upper magnetic layer coating material is applied onto said lower non-magnetic layer. The back-coat layer may be formed before or after or simultaneously with formation the lower non-magnetic layer and the upper magnetic layer.

For the coating means, any of, for example, gravure coat, reverse coat, extrusion nozzle, etc. may be used, but the method for using die nozzle coater is preferable from the viewpoint of operability and productivity.

In the present invention, in the case of magnetic tapes, it is preferable to orient magnetic particles in the magnetic layer by applying the magnetic field after the magnetic layer is formed. The orientation direction may be parallel or vertical or slanting with respect to the running direction of the medium in accord with purposes. In order to orient to the specified direction, it is preferable to apply the magnetic field 1000G or more with permanent magnet such as ferrite magnet or rare earth magnet, etc., electromagnet, solenoid, etc. or to use a plurality of these magnetic field generating means in combination. Furthermore, to achieve the highest orientation after drying, a suitable drying step may be effected before orientation or orientation is carried out simultaneously with drying. In the case of floppy disks, magnetic powders naturally oriented by coating may be brought to the non-orientation condition as much as possible with permanent magnet, electromagnet, solenoid, etc.

The magnetic coating layer that has undergone the orientation treatment in this way is, in general, dried and fixed by known drying and evaporation means such as hot air, far infrared rays, electric heater, vacuum equipment, etc. equipped inside the drying furnace. The drying temperature is in the range from room temperature to about 300° C., and may be suitably selected in accord with the heat resistance of the non-magnetic support, kind and/or concentration of solvent, etc., and temperature gradient may be provided inside the drying furnace. In addition, the gas atmosphere inside the drying furnace may be, in general, air or inert gas.

After drying the magnetic layer in this way, calendering is carried out for surface smoothing treatment as required. For the calendering roll, a combination of heat-resistant plastic rolls such as epoxy, polyester, nylon, polyimide, polyamide, polyimideamide, etc. (rolls with carbon, metal, or other inorganic compounds kneaded may be used) and metal rolls (three to seven-high combination) may be used. A combination of metal rolls only may be used.

The treatment temperature is, in general, 80° C. or higher, and the linear pressure is generally 200 kg/cm or higher, and preferably 250 kg/cm or higher, and the treatment speed is in the range from 20 m/min to 900 m/min. By suitably varying these conditions, it becomes possible to control the plastic deformation hardness Hv. It is recommended to suitably investigate these conditions in accord with the magnetic coating material.

EXAMPLES

The present invention will be described in more detail referring to embodiments, but the present invention should not be limited to these embodiments. Hereinafter, the term "parts" in the numerical value of the composition refers to parts by weight.

[Preparation of Upper Magnetic Layer Coating Material (a)]
(Preparation of Binder Solution)
Vinyl chloride type resin containing polar functional group

| | |
|---|---|
| (Tg: 75° C.)(Polar functional group: —SO$_3$Na) | 10 parts |
| Polyester polyurethane resin containing polar functional group (Tg: 20° C.) (Polar functional group: - OSO$_3$K) | 7 parts |
| MEK (methyl ethyl ketone) | 21 parts |
| Toluene | 21 parts |
| cyclohexanone | 21 parts |

The above compositions were charged into a hyper mixer and mixed with stirring to give a binder solution.

(Kneading)
The following compositions were charged into a pressure kneader and kneaded for 2 hours.

| | |
|---|---|
| α-Fe magnetic powder (Hc = 1605 Oe, σs = 126 emu/g, BET = 56 m$^2$/g, average major axis length = 0.10 μm) | 100 parts |
| α-Al$_{22}$O$_3$ (HIT-60A, manufactured by Sumitomo Chemical Co., Ltd.; average particle size = 0.20 μm) | 2 parts |
| α-Al$_2$O$_3$ (HIT-82, manufactured by Sumitomo Chemical Co., Ltd.; average particle size = 0.13 μm) | 10 parts |
| The binder solution | 40 parts |

The following compositions were added to the slurry after kneading, and the slurry was adjusted to an optimum viscosity for dispersing treatment.

| | |
|---|---|
| The binder solution | 40 parts |
| MEK | 15 parts |
| Toluene | 15 parts |
| Cyclohexanone | 15 parts |

(Dispersion)
The slurry was dispersed by a sand mill.

(Viscosity Adjusting Solution)
The following compositions were charged into a hyper mixer and mixed with stirring for one hour to give a viscosity adjusting solution. The viscosity adjusting solution was circulation-filtered by using a depth filter with 95% cut filtration accuracy of 1.2 μm. tearic acid 0.5 part

| | |
|---|---|
| Stearic acid | 0.5 part |
| Myristic acid | 0.5 part |
| Butyl stearate | 0.5 part |
| MEK | 65 parts |
| Toluene | 65 parts |
| Cyclohexanone | 65 parts |

(Viscosity Adjustment)
After the above solution and the dispersed slurry were mixed with stirring, the mixture was subjected to dispersion treatment again by a sand mill to give a coating material. The c coating material was circulation-filtered by using a depth filter with 95% cut filtration accuracy of 1.2 μm.

(Final Coating Material)
To 100 parts by weight of the coating material after filtration, 0.8 part by weight of an isocyanate compound (Coronate-L, manufactured by Nippon Polyurethane) was added, and the mixture was mixed with stirring and circulation-filtered by using a depth filter with 95% cut filtration accuracy of 1.2 μm to give a final coating material (a) for magnetic layer.

[Preparation of Upper Magnetic Layer Coating Materials (b)–(g)]

Upper magnetic layer coating materials (b) through (g) were prepared in the same manner as in the above preparation of the upper magnetic layer coating material (a) except that the following resins were respectively used in place of a total of 17 parts by weight of binder solution resins. In the following resins, the polar functional group contained in vinyl chloride type resin was —SO$_3$Na and the polar functional group contained in polyester polyurethane resin was —OSO$_3$K.

| | |
|---|---|
| (b) Vinyl chloride type resin containing polar functional group (Tg: 65° C.) | 7 parts |
| Polyester polyurethane resin containing polar functional group (Tg: 20° C.) | 10 parts |
| (c) Vinyl chloride type resin containing polar functional group (Tg: 65° C.) | 10 parts |
| Polyester polyurethane resin containing polar functional group (Tg: 70° C.) | 7 parts |
| (d) Vinyl chloride type resin containing polar functional group (Tg: 65° C.) | 7 parts |
| Polyester polyurethane resin containing polar functional group (Tg: 70° C.) | 10 parts |
| (e) Vinyl chloride type resin containing polar functional group (Tg: 80° C.) | 10 parts |
| Polyester polyurethane resin containing polar functional group (Tg: 20° C.) | 7 parts |
| (f) Vinyl chloride type resin containing polar functional group (Tg: 80° C.) | 10 parts |
| Polyester polyurethane resin containing polar functional group (Tg: 70° C.) | 7 parts |
| (g) Vinyl chloride resin containing polar functional group (Tg: 70° C.) | 10 parts |
| Polyester polyurethane resin not containing polar functional group (Tg: 40° C.) | 7 parts |

[Preparation of Lower Non-magnetic Layer Coating Material]
(Preparation of Binder Solution)
Electron radiation curing type vinyl chloride type resin
(Vinyl chloride—epoxy containing monomer copolymer; average degree of polymerization=310; epoxy content=3 wt %; S content=0.6 wt %; acryl content=6 groups/1 molecule; Tg

| | |
|---|---|
| = 60° C.) | 10 parts |
| Electron radiation curing type polyester polyurethane resin (Phosphorus compound - hydroxy containing polyester polyurethane; number average molecular weight = 13000; acryl content = 6 groups/1 molecule; Tg = 10° C.) | 7 parts |
| MEK | 21 parts |
| Toluene | 21 parts |
| Cyclohexanone | 21 parts |

The above compositions were charged into the hyper mixer and stirred to give a binder solution.

(Kneading)
The following compositions were charged in a pressure kneader and kneaded for 2 hours.

| | |
|---|---|
| Needle-form α-Fe₂O₃ | 10 parts |
| (DPN-250Bw manufactured by Toda Kogyo Corp.; average major axis length = 0.15 μm; specific surface area = 53 m²/g) | |
| Carbon black | 90 parts |
| (Raven 760B manufactured by Columbian Chemicals Company; average particle size = 30 nm, specific surface area = 70 m²/g; DPB oil absorption = 48 mL/100 g) | |
| The binder solution | 40 parts |

The following compositions were added to the slurry after kneading, and the slurry was adjusted to an optimum viscosity for dispersing treatment.

| | |
|---|---|
| The binder solution | 40 parts |
| MEK | 15 parts |
| Toluene | 15 parts |
| Cyclohexanone | 15 parts |

(Dispersion)
The slurry was dispersed by a sand mill.
(Viscosity Adjusting Solution)
The following compositions were charged into a hyper mixer, and stirred to give a viscosity adjusting solution.

| | |
|---|---|
| Stearic acid | 0.5 part |
| Myristic acid | 0.5 part |
| Butyl stearate | 0.5 part |
| MEK | 65 parts |
| Toluene | 65 parts |
| Cyclohexanone | 65 parts |

(Viscosity Adjustment and Final Coating Material)
After the above solution and the dispersed slurry were mixed with stirring, the mixture was subjected to dispersion treatment again by a sand mill to give a coating material. The coating material was circulation-filtered by using a depth filter with 95% cut filtration accuracy of 1.2 μm to give a final coating material for lower non-magnetic layer.

[Preparation of Back-coat Layer Coating Material]
(Preparation of Binder Solution)
Vinyl chloride-vinyl acetate-vinyl alcohol copolymer

| | |
|---|---|
| (Monomer weight ratio = 92:3:5; average degree of polymerization = 420) | 65 parts |
| Polyester polyurethane resin | 35 parts |
| (UR-8300 manufactured by Toyobo Co., Ltd.) | |
| MEK | 260 parts |
| Toluene | 260 parts |
| Cyclohexanone | 260 parts |

The above compositions were charged into the hyper mixer and stirred to give a binder solution.
(Dispersion)
The following compositions were charged in a ball mill and dispersed for 24 hours.

| | |
|---|---|
| Carbon black | 80 parts |
| (Conductex sC manufactured by Columbian Chemicals Company; average particle size = 20 nm, BET = 220 m²/g) | |
| Carbon black | 1 part |
| (Sevacarb MT manufactured by Columbian Chemicals Company; average particle size = 350 nm, BET = 8 m²/g) | |
| α-Fe₂O₃ | 1 part |
| (TF100 manufactured by Toda Kogyo; average particle size = 0.1 μm) | |
| The binder solution | 880 parts |

(Viscosity Adjusting Solution)
The following compositions were charged into a hyper mixer, and stirred to give a viscosity adjusting solution.

| | |
|---|---|
| Stearic acid | 1 part |
| Myristic acid | 1 part |
| Dutyl stearate | 2 parts |
| MEK | 210 parts |
| Toluene | 210 parts |
| Cyclohexanone | 210 parts |

(Viscosity Adjustment)
After the above solution and the dispersed slurry were mixed with stirring, the mixture was subjected to dispersion treatment again by a ball mill for 3 hours to give a coating material. The coating material was circulation-filtered by using a depth filter with 95% cut filtration accuracy of 1.2 μm.
(Final Coating Material)
To 100 parts by weight of the coating material after filtration, 1 part by weight of an isocyanate compound (Coronate-L manufactured by Nippon Polyurethane) was added, and the mixture was mixed with stirring and circulation-filtered by using a depth filter with 95% cut filtration accuracy of 1.2 μm to give a coating material for back-coat layer.

[Preparation of Magnetic Tape]

Example 1

In manufacturing the magnetic recording medium, it is preferable that the lower non-magnetic layer coating material is applied onto the non-magnetic support and dried, and resulting layer is smoothed and radiation-irradiated to obtain the lower non-magnetic layer, and then the upper magnetic layer coating material is applied onto said lower non-magnetic layer. The back-coat layer may be formed before or after or simultaneously with formation the lower non-magnetic layer and the upper magnetic layer.

The lower non-magnetic layer coating material was applied onto a surface of a non-magnetic support (6.0-μm-thick polyethylene terephthalate film) and dried, and resulting layer was calendered and irradiated with electron radiation in nitrogen gas atmosphere to obtain cured layer. Onto this lower non-magnetic layer, the upper magnetic layer coating material (a) was applied, followed by orientation treatment, drying, and calendering (at 80° C., linear pressure: 330 kg/cm). Further, the back-coat layer coating material was applied onto the back surface of the non-magnetic support. After drying, calendering was carried out. The coating material feed rate was adjusted so that a thickness of 2 μm was achieved for the lower non-magnetic layer, a thickness of 0.25 μm for the upper magnetic layer, and a thickness of 0.5 μm for the back-coat layer, respectively.

After resulting roll was let to stand at ordinary room temperature for 24 hours, the roll was cured at 60° C. in a heating oven for 24 hours, and then slit down to a width of 12.65 mm and incorporated in DLT cassette to give a magnetic tape sample.

Example 2

A magnetic tape sample was prepared in the same manner as in Example 1 except that the upper magnetic layer coating material was changed to (c).

Example 3

A magnetic tape sample was prepared in the same manner as in Example 1 except that the upper magnetic layer coating material was changed to (d).

Example 4

A magnetic tape sample was prepared in the same manner as In Example 1 except that the upper magnetic layer coating material was changed to (e).

Example 5

A magnetic tape sample was prepared in the same manner as in Example 1 except that the upper magnetic layer coating material was changed to (f).

Example 6

A magnetic tape sample was prepared in the same manner as in Example 1 except that the calendering conditions after application of the upper magnetic layer were changed to a temperature of 100° C. and a linear pressure of 330 kg/cm.

Example 7

A magnetic tape sample was prepared in the same manner as in Example 1 except that the thermosetting condition was changed to 70° C. for 48 hours.

Comparative Example 1

A magnetic tape sample was prepared in the same manner as in Example 1 except that the upper magnetic layer coating material was changed to (b).

Comparative Example 2

A magnetic tape sample was prepared in the same manner as in Example 1 except that the upper magnetic layer coating material was changed to (g).

Comparative Example 3

A magnetic tape sample was prepared in the same manner as in Example 5 except that the calendering conditions after application of the upper magnetic layer were changed to a temperature of 100° C. and a linear pressure of 330 kg/cm.

Comparative Example 4

A magnetic tape sample was prepared in the same manner as in Example 5 except that the thermosetting condition was changed to 70° C. for 48 hours.

[Measurement and Evaluation of Magnetic Tape Samples]

1. Plastic Deformation Hardness (Hv) and Young's Modulus (E)

Using the super-fine indentation hardness testing machine "ENT-1100" manufactured by ERIONIX, one drop of Alon Alfa instantaneous adhesive manufactured by Toagosei Co., Ltd. was dripped on a sample holder, and a tape sample was affixed onto the sample holder and left to stand for 6 hours in environment of 28° C. The resulting test sample was measured 10 times, and obtain the average value of 8 data excluding the maximum and minimum values.

Measurement conditions were shown as follows:
Indenter profile: Angle between ridges=115° trigonal pyramid indenter
Load: 4 mgf
Loading (unloading) speed: $4e^{-04}$ mgf/msec
Indentation depth: within 0.1 μm from the surface The elastic deformation rate and plastic deformation rate were found from the graph at the time of unloading from the maximum displacement point ($h_{max}$). Let $P_{max}$ denote the maximum load.

The unloading curve from $h_{max}$ to the 50% point was expressed by an approximate quadratic curve, a tangent to $h_{max}$ was extended and the X coordinate that intersected with the X axis was denoted "H1," and "H2" was expressed by $H2=h_{max}-H1$. FIG. 1 shows the graph at the time of unloading. Plastic deformation hardness Hv (mgf/μm$^2$)=0.037926 $P_{max}/H1^2$ Young's modulus E (mgf/μm$^2$)=181.029×10$^{-3}$× $P_{max}/(H1 \times H2)$ 2. Durability A commercially available data drive was modified, to which a TDK experimental MR head was mounted, and a shorter durability test was carried out at 23° C. and 50% RH in 200,000 passes, and the 5-step rating shown below was implemented in terms of number of retries.

5: no increase of the number of retries after 200,000 passes is recognized.
4: an increase of the number of retries after 200,000 passes is less than 10 times with respect to the initial stage.
3: an increase of the number of retries after 200,000 passes is 10 times or more and less than 50 times with respect to the initial stage.
2: an increase of the number of retries after 200,000 passes is 50 times or more with respect to the initial stage.
1: running was stopped before 200,000 passes were made.

3. Output (MR Head Electromagnetic Conversion Characteristics Evaluator)

Using a tester with a commercially available data drive modified to enable signal input and output to the head, measurement was carried out with the TDK experimental MR head mounted.

Measurement condition
Recording head: MIG (gap 1 μm)
Reproducing head: MR head (gap 0.4 μm)

TABLE 1

| | Plastic deformation hardness (Hv) | Young's modulus (E) | Durability | Output |
|---|---|---|---|---|
| Example 1 | 115 | 2149 | 4 | 100% |
| Example 2 | 158 | 2674 | 5 | 103% |
| Example 3 | 170 | 2713 | 5 | 105% |
| Example 4 | 126 | 2358 | 5 | 103% |
| Example 5 | 187 | 2875 | 4 | 96% |
| Example 6 | 134 | 2187 | 4 | 103% |
| Example 7 | 118 | 2489 | 4 | 101% |
| Comparative Example 1 | 91 | 1850 | 2 | 97% |
| Comparative Example 2 | 78 | 2159 | 2 | 98% |
| Comparative Example 3 | 209 | 2942 | 1 | 93% |
| Comparative Example 4 | 196 | 3096 | 3 | 88% |

From Table 1, in tape samples according to Examples 1 through 7, when they were applied to the MR head, the durability and output satisfactory for practical use were obtained. In Comparative Examples 1 through 4, the durability was degraded and error was aggravated.

As this invention may be embodied in several forms without departing from the spirit or essential characteristics thereof, the foregoing examples are therefore only illustrative and should not be interpreted as restrictive, and all changes that fall within equivalence of claims are therefore intended to be embraced by the claims.

What is claimed is:

1. A magnetic recording medium comprising at least a lower non-magnetic layer containing at least a non-magnetic powder and a binder resin formed on a non-magnetic support and an upper magnetic layer formed on the lower non-magnetic layer, wherein the magnetic recording medium is used for a recording-reproducing system in which recorded signals are reproduced by an MR head, and the upper magnetic layer contains at least two kinds of binder resins and a mean glass transition temperature Tg calculated from each Tg of the at least two kinds of binder resins is 40° C. to 80° C., and a plastic deformation hardness Hv from the upper magnetic layer surface to an indentation depth of 0.1 $\mu$m is 100 to 200 mgf/$\mu$m$^2$ and a Young's modulus E in a thickness direction from the upper magnetic layer surface to the indentation depth of 0.1 $\mu$m is 2,000 to 3,000 mgf/$\mu$m$^2$.

2. The magnetic recording medium according to claim 1, wherein the binder resin contained in the lower non-magnetic layer is radiation curing binder resin.

3. The magnetic recording medium according to claim 1, wherein the upper magnetic layer contains a resin with polar functional group as the binder resin.

4. The magnetic recording medium according to claim 1, wherein the upper magnetic layer contains vinyl chloride copolymer and polyurethane resin as the binder resin.

5. The magnetic recording medium according to claim 1, wherein the upper magnetic layer contains a resin with polar functional group as the binder resin, wherein the polar functional group is selected from the group consisting of acidic polar group, basic polar group and betaine.

6. The magnetic recording medium according to claim 1, wherein the upper magnetic layer contains a resin with polar functional group as the binder resin, wherein the polar functional group is selected from the group consisting of —COOH, —SO$_3$X, —OSO$_3$X, —OPO$_3$X, —PO$_3$X, —PO$_2$X, —N$^+$R$_3$Cl$^-$, and —NR$_2$, where X represents H or alkaline metal, and R represents H or alkyl group.

7. The magnetic recording medium according to any one of claims 1, 2, 3, 4, 5 and 6, wherein a thickness of the upper magnetic layer is 0.3 $\mu$m or less.

* * * * *